US008843873B1

(12) United States Patent
Sharma et al.

(10) Patent No.: US 8,843,873 B1
(45) Date of Patent: Sep. 23, 2014

(54) CAPACITIVE CELL LOAD ESTIMATION USING ELECTROMIGRATION ANALYSIS

(71) Applicants: Pramod Sharma, Noida (IN); Madhur Kashyap, Noida (IN); Narayanan Kannan, Delhi (IN)

(72) Inventors: Pramod Sharma, Noida (IN); Madhur Kashyap, Noida (IN); Narayanan Kannan, Delhi (IN)

( * ) Notice: Subject to any disclaimer, the term of this patent is extended or adjusted under 35 U.S.C. 154(b) by 0 days.

(21) Appl. No.: 14/100,005

(22) Filed: Dec. 8, 2013

(51) Int. Cl.
*G06F 17/50* (2006.01)

(52) U.S. Cl.
CPC .................................... *G06F 17/50* (2013.01)
USPC ........................... 716/133; 716/132; 716/136

(58) Field of Classification Search
CPC ..... G06F 3/044; G06F 17/5009; G06F 3/046; H02J 7/025; H02M 3/33507
USPC ......................................... 716/132–133, 136
See application file for complete search history.

(56) References Cited

U.S. PATENT DOCUMENTS

| | | | | |
|---|---|---|---|---|
| 5,831,867 | A | 11/1998 | Aji | |
| 6,532,570 | B1 | 3/2003 | Mau | |
| 6,578,178 | B2 | 6/2003 | Mau | |
| 6,954,914 | B2 | 10/2005 | Sundar | |
| 7,043,705 | B2 | 5/2006 | Somayaji | |
| 7,971,171 | B2 | 6/2011 | Keinert | |
| 2003/0088842 | A1 * | 5/2003 | Cirit | 716/9 |
| 2004/0049750 | A1 * | 3/2004 | Gentry et al. | 716/5 |

* cited by examiner

*Primary Examiner* — Nghia Doan
(74) *Attorney, Agent, or Firm* — Charles Bergere

(57) ABSTRACT

A method of estimating capacitive cell load of cells in an integrated circuit (IC) design uses first maximum capacitive load values $C_{MAX\_LIB}$ in calculating risk of electromigration failure in cells of the IC design. $C_{MAX\_LIB}$ is saved for a cell whose risk of electromigration failure is acceptable. For a failed cell, a revised maximum capacitive load value $C_{MAX\_2}$ is reduced as the ratio of an actual current $I_{ACTUAL\_1}$ relative to the electromigration current limit $I_{LIMIT}$ in the weakest element of the cell. A revised actual current $I_{ACTUAL\_2}$ is obtained as a function of transition times with $C_{MAX\_2}$. $C_{MAX\_2}$ is saved for the cell if $I_{ACTUAL\_2}$ is less than $I_{LIMIT}$. Otherwise the steps of calculating $C_{MAX\_2}$ and $I_{ACTUAL\_2}$ are re-iterated. $C_{MAX\_2}$ is reduced relative to $C_{MAX\_LIB}$ for the first iteration and is further reduced relative to its previous value $C_{MAX\_2}$ for subsequent iterations.

15 Claims, 2 Drawing Sheets

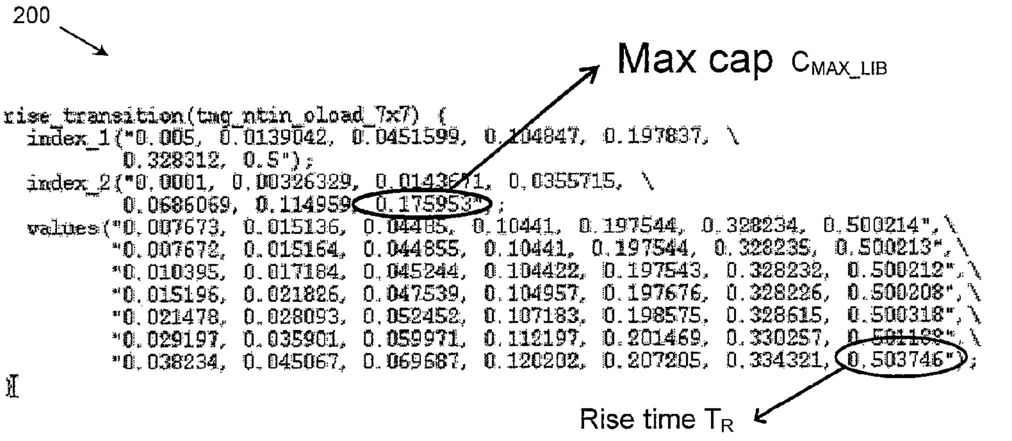

FIG. 2

```
rise_transition(tmg_ntin_oload_7x7) {
  index_1("0.005, 0.0139042, 0.0451599, 0.104847, 0.197837, \
           0.328312, 0.5");
  index_2("0.0001, 0.00326329, 0.0143271, 0.0355715, \
           0.0686069, 0.114959, 0.175953");
  values("0.007673, 0.015136, 0.044855, 0.10441, 0.197544, 0.328234, 0.500214",\
         "0.007672, 0.015164, 0.044855, 0.10441, 0.197544, 0.328235, 0.500213",\
         "0.010395, 0.017184, 0.045244, 0.104422, 0.197543, 0.328232, 0.500212",\
         "0.015196, 0.021826, 0.047539, 0.104957, 0.197676, 0.328226, 0.500208",\
         "0.021478, 0.028093, 0.052452, 0.107183, 0.198575, 0.328615, 0.500318",\
         "0.029197, 0.035901, 0.059971, 0.112197, 0.201469, 0.330257, 0.501169",\
         "0.038234, 0.045067, 0.069687, 0.120202, 0.207205, 0.334321, 0.503746");
}
```

Max cap $C_{MAX\_LIB}$ → 0.175953

Rise time $T_R$ → 0.503746

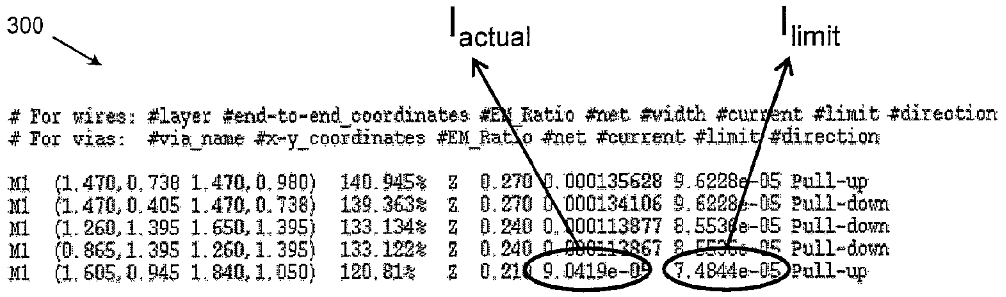

FIG. 3

```
# For wires: #layer #end-to-end_coordinates #EM_Ratio #net #width #current #limit #direction
# For vias:  #via_name #x-y_coordinates #EM_Ratio #net #current #limit #direction

M1 (1.470,0.738 1.470,0.980)  140.945%  z  0.270  0.000135628  9.6228e-05  Pull-up
M1 (1.470,0.405 1.470,0.738)  139.363%  z  0.270  0.000134106  9.6228e-05  Pull-down
M1 (1.260,1.395 1.650,1.395)  133.134%  z  0.240  0.000113877  8.553e-05   Pull-down
M1 (0.865,1.395 1.260,1.395)  133.122%  z  0.240  0.000113867  8.553e-05   Pull-down
M1 (1.605,0.945 1.840,1.050)  120.81%   z  0.210  9.0419e-05   7.4844e-05  Pull-up
```

$I_{actual}$ → 9.0419e-05    $I_{limit}$ → 7.4844e-05

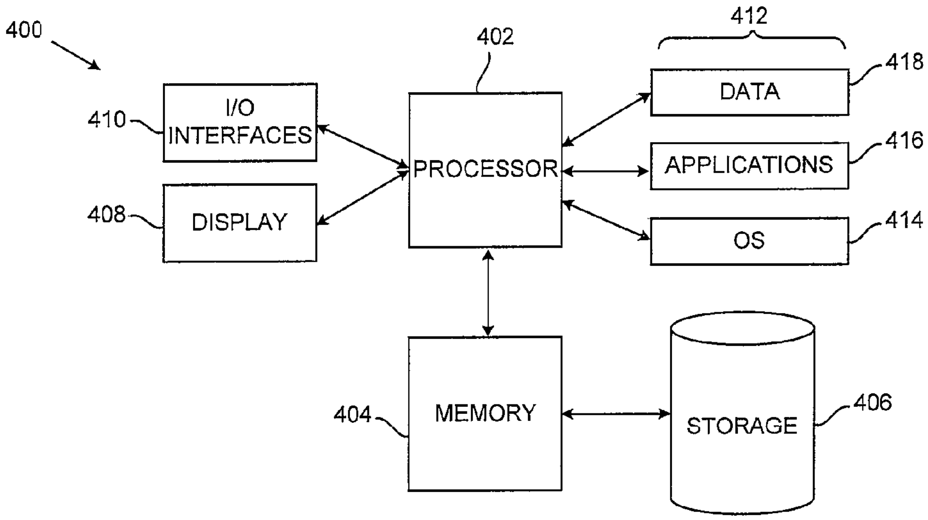

FIG. 4

CAPACITIVE CELL LOAD ESTIMATION USING ELECTROMIGRATION ANALYSIS

BACKGROUND OF THE INVENTION

The present invention is directed to integrated circuit design tools and, more particularly, to an electronic design automation tool for estimating capacitive cell load using electromigration analysis.

Integrated circuits (ICs) are designed using electronic design automation (EDA) tools. During the design flow, register-transfer-level (RTL) abstraction typically is used in hardware description languages (HDLs) like Verilog and VHDL to create high-level representations of the IC, selecting standard cell designs and their characteristics from a standard cell library. An RTL description is defined in terms of registers that store signal values, and combinational logic that performs logical operations on signal values. The RTL description is typically converted to a gate-level description (such as a netlist) that can then be used by placement and routing tools to create a physical layout.

The standard cell library contains look-up tables of variables of the different standard cells, for example input and output currents and voltages as a function of load impedances and the characteristics of the cells. In addition, the standard cell library contains look-up tables of minimum and maximum values of various parameters that should be enforced to avoid risk of functional failures of the cells, referred to as a Liberty file. The limiting values in the Liberty file take account of various process, operating voltage and temperature (PVT) variables and many different failure mechanisms.

Operational analog variables of the gate-level representation, like voltages, currents, rise and fall times and so on, can then be simulated using programs such as the Simulation Program with Integrated Circuit Emphasis (SPICE) and compared with limits defined by specifications for the cells.

Electromigration is a reliability phenomenon that is increasingly relevant to IC design as IC feature sizes are reduced without corresponding reductions in current levels in and between the cells and their loads, resulting in increased current density. Electromigration is caused by transfer of momentum from electrons to ions in a conductor, and can produce voids resulting in open circuit failure of the conductor, or growth of the conductor (whiskers or bumps) leading to short circuit with an adjacent conductor.

Electromigration is a function of the load on the output of the cell, and a limiting value of the load appears in the Liberty file. However the load current density causing possible electromigration failure is also a function of variables including the actual operating frequency, or pulse rise and fall times of the cell output voltage. It has been found that electromigration failure of a cell may occur at capacitive load values within the load limits indicated by the Liberty file.

It is possible to simulate and analyze the risks of electromigration using established calculations of the cells as a function of the voltages, load values and operating frequency, or pulse rise and fall times of the cells. However, calculating the maximum allowable load capacitance for all the cells in the IC design can be very calculation-intensive and time-consuming. Thus, it would be advantageous to have a method of doing so efficiently and with a higher degree of automation.

BRIEF DESCRIPTION OF THE DRAWINGS

The present invention, together with objects and advantages thereof, may best be understood by reference to the following description of embodiments thereof shown in the accompanying drawings. Elements in the drawings are illustrated for simplicity and clarity and have not necessarily been drawn to scale.

FIG. 2 is an example of data in a type of library file that can be used in the method of FIG. 1;

FIG. 3 is an example of data in an electromigration analysis that can be used in the method of FIG. 1; and FIG. 4 is a schematic block diagram of an EDA tool in accordance with an embodiment of the present invention for performing the methods of FIG. 1.

DETAILED DESCRIPTION OF THE INVENTION

Figure 1:
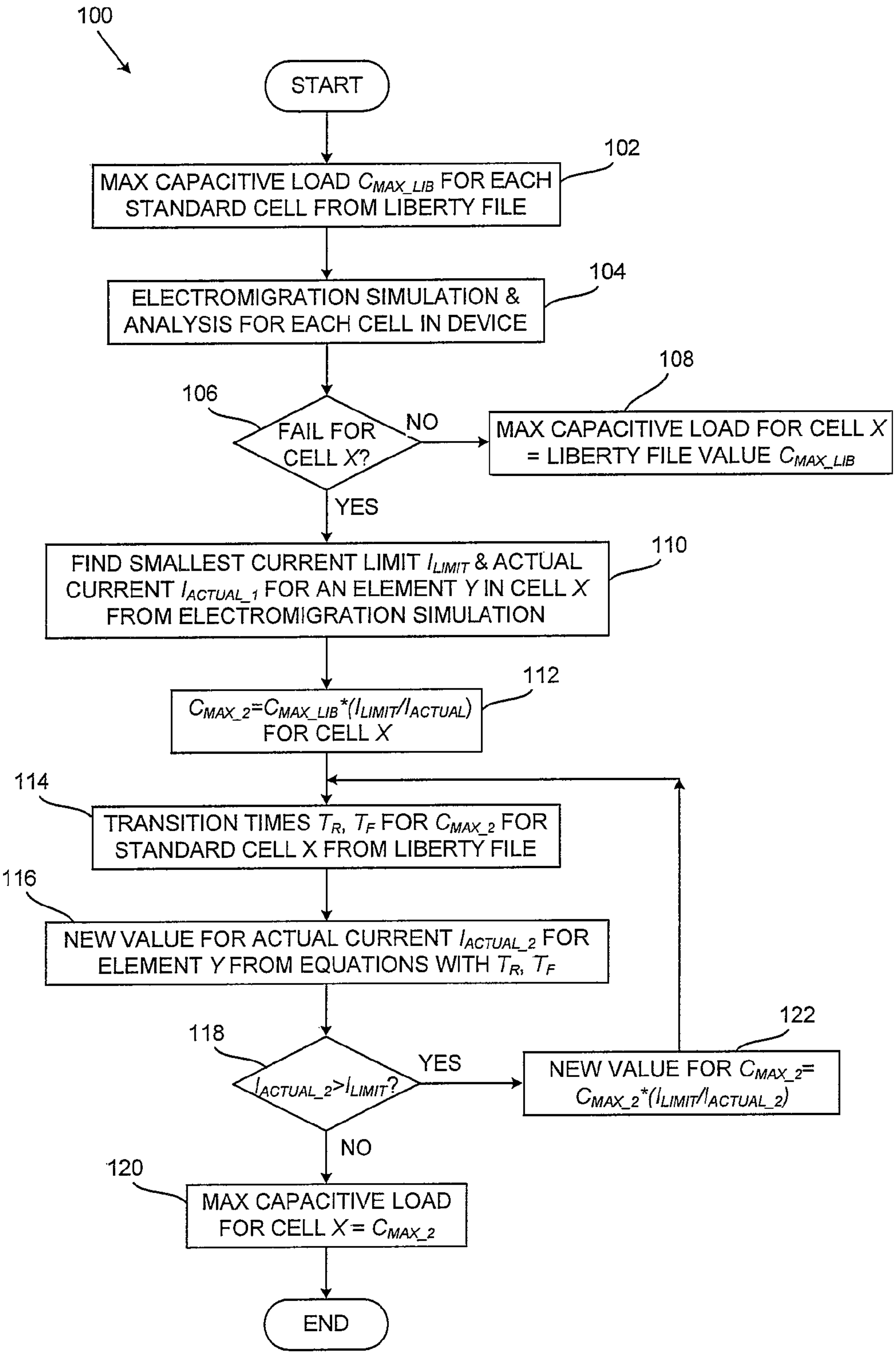
FIG. 1 is a flow chart of a method of estimating maximum capacitive cell load in a processing device in accordance with one embodiment of the invention, given by way of example.

FIG. 1 illustrates a method 100 of estimating capacitive cell load in an integrated circuit (IC) design in accordance with one embodiment of the invention. The method 100 is performed using an electronic design automation (EDA) tool such as an EDA tool 400 shown in FIG. 4, which includes a processor 402 and a memory 404, 406 coupled to the processor 402, with the integrated circuit design being stored in the memory 404, 406. Instructions corresponding to the steps of the method 100 may be stored in a non-transitory computer-readable storage medium and, when executed by the EDA tool 400, can cause the EDA tool to perform the method 100.

The method 100 comprises steps 102 to 108 of using first maximum capacitive load values $C_{MAX\_LIB}$ stored in the memory 404, 406 in calculating, using the processor 402, risk of electromigration failure in cells of the IC design. The first maximum capacitive load values $C_{MAX\_LIB}$ are saved for cells whose risk of electromigration failure is acceptable.

In steps 110 and 112, for a failed cell X from steps 102 to 106, a revised maximum capacitive load value $C_{MAX\_2}$ is calculated, using the processor 402. The revised maximum capacitive load value $C_{MAX\_2}$ is equal to the first maximum capacitive load value reduced as a function of an actual current $I_{ACTUAL\_1}$ relative to an electromigration current limit $I_{LIMIT}$ in a weakest element Y that has the smallest electromigration current limit $I_{LIMIT}$ in the electromigration calculation of step 104 for the failed cell X.

In steps 114 and 116, a revised actual current $I_{ACTUAL\_2}$ in the weakest element Y is calculated, using the processor 402, as a function of transition times $T_R$, $T_F$ with the revised maximum capacitive load value $C_{MAX\_2}$ for the failed cell X.

In steps 118 to 122, the revised maximum capacitive load value $C_{MAX\_2}$ for the failed cell X is saved if the revised actual current $I_{ACTUAL\_2}$ is less than the electromigration current limit $I_{LIMIT}$ of the weakest element Y. Otherwise steps 114 to 122 are repeated.

The revised maximum capacitive load value $C_{MAX\_2}$ of step 112 is reduced relative to the first value $C_{MAX\_LIB}$ of step 102 for the first performance of step 112 for a cell X. In the example described in detail below, the revised maximum capacitive load value $C_{MAX\_2}$ is calculated according to the relationship $C_{MAX\_2}=C_{MAX\_LIB}*(I_{LIMIT}/I_{ACTUAL})$, although it will be appreciated that other relationships may be used. The revised maximum capacitive load value $C_{MAX\_2}$ is further reduced in step 122 relative to the previous revised maximum capacitive load value $C_{MAX\_2}$ of step 112 for a subsequent iteration of steps 118 to 122 for that cell X, for example according to the relationship $C_{MAX\_2}=C_{MAX\_2}*(I_{LIMIT}/I_{ACTUAL\_2})$.

The risk of electromigration failure may be verified with the saved values $C_{MAX\_LIB}$ or $C_{MAX\_2}$ of maximum capacitive loads of the cells after steps 102 to 122 are completed. If the verified risk of electromigration failure is unacceptable for at least one cell, the integrated circuit design may be modified, the modified design stored in the memory 404, 406, and steps 102 to 122 re-iterated.

The first maximum capacitive load values $C_{MAX\_LIB}$ may be obtained from the Liberty file of the library file for the standard cell. The standard cell Liberty file takes account of different functional criteria and failure modes but an unacceptable risk of electromigration failure can still occur at capacitive loads within the Liberty file limits, as a function of the cell actual operating frequency or actual current pulse rise/fall (transition) times. The method 100 enables an estimation of the electromigration limits on maximum capacitive load for the cell considered, with a rapid and efficient calculation convergence to the approximate limits.

In more detail, in step 102 the first maximum capacitive load values $C_{MAX\_LIB}$ are extracted from a look-up table in the Liberty file for each of the cells considered. An example 200 of values in the look-up table is shown in FIG. 2 for a particular cell. An electromigration analysis is performed at 104 for each of the relevant cells of the IC design in order to calculate risk of electromigration failure in the cells. A decision is taken at 106 whether the risk of electromigration failure of the cell X with the first maximum capacitive load value $C_{MAX\_LIB}$ is acceptable, that is to say is within defined limits. If the risk of electromigration failure of the cell X with the first value $C_{MAX\_LIB}$ is acceptable, the first value $C_{MAX\_LIB}$ is saved at 108 for the cell X.

If the risk of electromigration failure of the cell X with the first value $C_{MAX\_LIB}$ is not acceptable, that is to say that the risk is greater than the defined limits, the revised maximum capacitive load value $C_{MAX\_2}$ is estimated. In step 110, the weakest element Y of the cell X is identified. The weakest element Y is the interconnection or other element in the failed cell X which has the smallest electromigration current limit $I_{LIMIT}$. The values of the actual current $I_{ACTUAL\_1}$ and of the electromigration current limit $I_{LIMIT}$ are obtained from the electromigration calculation of step 104. FIG. 3 illustrates an example 300 of values resulting from the electromigration analysis calculation for a particular cell.

In step 112, the revised maximum capacitive load value $C_{MAX\_2}$ is calculated by reducing the previous value, the first maximum capacitive load value $C_{MAX\_LIB}$, in proportion to the ratio of the actual current $I_{ACTUAL\_1}$ relative to the electromigration current limit $I_{LIMIT}$ in the weakest element Y, that is to say according to the relationship $C_{MAX\_2}=C_{MAX\_LIB}*(I_{LIMIT}/I_{ACTUAL})$. The values of actual currents $I_{ACTUAL\_1}$ and electromigration current limits $I_{LIMIT}$ may include peak current values and/or root mean square (rms) current values and/or average current values.

In step 114, the transition times with the revised maximum capacitive load value $C_{MAX\_2}$ for the failed cell X are obtained, and may be pulse rise and/or fall times $T_R$, $T_F$ or may be other parameters relating to operating frequency. The transition times used in step 114 may be maximum transition times, such as $T_R$ shown in FIG. 2, obtained from the Liberty file. However, in step 114 the transition times are recalculated with the revised maximum capacitive load $C_{MAX\_2}$ for a given input signal slew rate. A new value for the revised actual current $I_{ACTUAL\_2}$ in the weakest element Y is obtained in step 116 with the revised maximum capacitive load $C_{MAX\_2}$.

In step 118, a decision is taken whether the risk of electromigration failure of the cell X with the revised maximum capacitive load $C_{MAX\_2}$ is acceptable. If the risk of electromigration failure of the cell X with the revised maximum capacitive load $C_{MAX\_2}$ is acceptable, the revised value $C_{MAX\_2}$ is saved at 120 for the cell X.

If the risk of electromigration failure of the cell X with the revised value $C_{MAX\_2}$ is not acceptable, the steps 114 to 122 are re-iterated. The revised maximum capacitive load value $C_{MAX\_2}$ used in step 114 is further reduced in step 122 relative to the previous revised maximum capacitive load value $C_{MAX\_2}$ of step 112 for an iteration of steps 118 to 122 for the cell X. In step 122, the further revised value of the maximum capacitive load value $C_{MAX\_2}$ is calculated according to the relationship $C_{MAX\_2}=C_{MAX\_2}*(I_{LIMIT}/I_{ACTUAL\_2})$.

When all relevant cells in the device have been analyzed by the method 100, and values of maximum capacitive loads $C_{MAX\_LIB}$ or $C_{MAX\_2}$ have been saved at 108 or 120 for all the relevant cells, the risk of electromigration failure is verified with the values $C_{MAX\_LIB}$ or $C_{MAX\_2}$ of the cells. If the verified risk of electromigration failure is unacceptable for at least one cell, the integrated circuit design may be modified, the modified design stored in the memory 404, 406, and steps 102 to 122 re-iterated.

The invention may be implemented at least partially in a non-transitory machine-readable medium containing a computer program for running on a computer system, the program at least including code portions for performing steps of a method according to the invention when run on a programmable apparatus, such as a computer system.

FIG. 4 is a schematic block diagram of an EDA tool 400 in accordance with an embodiment of the present invention for performing the methods of the present invention described above. The EDA tool 400 includes a processor 402 coupled to a memory 404 and additional memory or storage 406 coupled to the memory 404. The EDA tool 400 also includes a display device 408, input/output interfaces 410, and software 412. The software 412 includes operating system software 414, applications programs 416, and data 418. The applications programs 416 can include, among other things, a gate-level simulator and a calculation of risk of electromigration failure in cells of the integrated circuit design, and the data 418 can include a gate-level design, a modified or corrected gate-level design, and a cell library. The EDA tool 400 generally is known in the art except for the software used to implement the method described above regarding estimating maximum capacitive cell load in an integrated circuit design. When software or a program is executing on the processor 402, the processor becomes a "means-for" performing the steps or instructions of the software or application code running on the processor 402. That is, for different instructions and different data associated with the instructions, the internal circuitry of the processor 402 takes on different states due to different register values, and so on, as is known by those of skill in the art. Thus, any means-for structures described herein relate to the processor 402 as it performs the steps of the methods disclosed herein.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on non-transitory computer-readable media permanently, removably or remotely coupled to an information processing system. The computer-readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM and so on; and data transmission media including computer networks, point-to-point telecommunication equipment, and carrier wave transmission media, just to name a few.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the above described operations are merely illustrative. Multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, the word ‘comprising’ or ‘having’ does not exclude the presence of other elements or steps then those listed in a claim. Furthermore, the terms “a” or “an,” as used herein, are defined as one or more than one. Also, the use of introductory phrases such as “at least one” and “one or more” in the claims should not be construed to imply that the introduction of another claim element by the indefinite articles “a” or “an” limits any particular claim containing such introduced claim element to inventions containing only one such element, even when the same claim includes the introductory phrases “one or more” or “at least one” and indefinite articles such as “a” or “an”. The same holds true for the use of definite articles. Unless stated otherwise, terms such as “first” and “second” are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method of estimating capacitive cell load in an integrated circuit design using an electronic design automation (EDA) tool, wherein the EDA tool includes a processor and a memory coupled to the processor, wherein the integrated circuit design is stored in the memory, comprising:

a) using first maximum capacitive load values stored in the memory to calculate, using the processor, a risk of electromigration failure in cells of the integrated circuit design, and saving the first maximum capacitive load values for cells whose risk of electromigration failure is acceptable;

b) for a failed cell from step a), calculating, using the processor, a revised maximum capacitive load value that is equal to the first maximum capacitive load value reduced as a function of an actual current relative to an electromigration current limit in a weakest element that has the smallest electromigration current limit in the electromigration calculation of step a) for the failed cell;

c) calculating, using the processor, a revised actual current in the weakest element as a function of transition times with the revised maximum capacitive load value for the failed cell; and d) saving the revised maximum capacitive load value for the failed cell if the revised actual current is less than the electromigration current limit of the weakest element, or otherwise re-iterating steps b) to d);

wherein the revised maximum capacitive load value of step b) is reduced relative to the first value of step a) for the first performance of step b) for a cell, and is further reduced relative to the previous revised maximum capacitive load value of step d) for a subsequent iteration of steps b) to d) for the failed cell.

2. The method of claim 1, wherein the risk of electromigration failure is verified with the saved values of maximum capacitive loads of the cells after steps a) to d) are completed.

3. The method of claim 2, wherein if the verified risk of electromigration failure is unacceptable for at least one cell, the integrated circuit design is modified, the modified design is stored in the memory, and steps a) to d) are re-iterated.

4. The method of claim 1, wherein the revised maximum capacitive load for the failed cell in step b) is reduced in proportion to the ratio of actual current and electromigration current limit of its weakest element.

5. The method of claim 1, wherein the transition times used in step c) in obtaining the revised actual current are maximum transition times obtained from a library file, stored in the memory, with the revised maximum capacitive load.

6. The method of claim 1, wherein the values of actual currents and electromigration current limits include peak current values.

7. The method of claim 1, wherein the values of actual currents and electromigration current limits include root mean square (rms) current values.

8. The method of claim 1, wherein the values of actual currents and electromigration current limits include average current values.

9. A non-transitory computer-readable storage medium storing instructions for execution by an electronic design automation (EDA) tool including a processor and a memory coupled to the processor, wherein the integrated circuit design is stored in the memory, and, when executed by the EDA tool, cause the computer to perform a method of estimating capacitive cell load in an integrated circuit design stored in the memory, the method comprising:

a) using first maximum capacitive load values stored in the memory in calculating, using the processor, risk of electromigration failure in cells of the integrated circuit design, and saving the first maximum capacitive load values for cells whose risk of electromigration failure is acceptable;

b) for a failed cell from step a), calculating, using the processor, a revised maximum capacitive load value that is equal to the first maximum capacitive load value reduced as a function of an actual current relative to an electromigration current limit in a weakest element that has the smallest electromigration current limit in the electromigration calculation of step a) for the failed cell;

c) calculating, using the processor, a revised actual current in the weakest element as a function of transition times with the revised maximum capacitive load value for the failed cell; and d) saving the revised maximum capacitive load value for the failed cell if the revised actual current is less than the electromigration current limit of the weakest element, or otherwise re-iterating steps b) to d);

wherein the revised maximum capacitive load value of step b) is reduced relative to the first value of step a) for the first performance of step b) for a cell, and is further reduced relative to the previous revised maximum capacitive load value of step d) for a subsequent iteration of steps b) to d) for the failed cell.

10. The non-transitory computer-readable storage medium of claim 9, wherein the risk of electromigration failure is verified with the saved values of maximum capacitive loads of the cells after steps a) to d) are completed.

11. The non-transitory computer-readable storage medium of claim 9, wherein the revised maximum capacitive load for the failed cell in step b) is reduced in proportion to the ratio of actual current and electromigration current limit of its weakest element.

12. The non-transitory computer-readable storage medium of claim 9, wherein the transition times used in step c) in obtaining the revised actual current are maximum transition times obtained from a library file with the revised maximum capacitive load for the failed cell.

13. The non-transitory computer-readable storage medium of claim 9, wherein the values of actual currents and electromigration current limits include peak current values.

14. The non-transitory computer-readable storage medium of claim 9, wherein the values of actual currents and electromigration current limits include root mean square (rms) current values.

15. The non-transitory computer-readable storage medium of claim 9, wherein the values of actual currents and electromigration current limits include average current values.

* * * * *